(12) United States Patent
Ben-Harrush et al.

(10) Patent No.: US 9,396,170 B2
(45) Date of Patent: Jul. 19, 2016

(54) HYPERLINK DATA PRESENTATION

(71) Applicant: GLOBALFOUNDRIES U.S. 2 LLC, Hopewell Junction, NY (US)

(72) Inventors: Idan Ben-Harrush, Givat Elah (IL); Anat Berkman, Haifa (IL); Alexander Dvinsky, Haifa (IL); Nili Guy, Haifa (IL); Samuel Kallner, Tal Menashe (IL); Andrei Kirshin, Haifa (IL); Dmitri Pikus, Haifa (IL); Yoav Rubin, Haifa (IL); Gal Shachor, Yokneam (IL); Omer Tripp, Har Adar (IL)

(73) Assignee: GLOBALFOUNDRIES INC., Grand Cayman (KY)

( * ) Notice: Subject to any disclaimer, the term of this patent is extended or adjusted under 35 U.S.C. 154(b) by 147 days.

(21) Appl. No.: 14/076,269

(22) Filed: Nov. 11, 2013

(65) Prior Publication Data

US 2015/0135324 A1   May 14, 2015

(51) Int. Cl.
*H04L 29/06* (2006.01)
*G06F 17/22* (2006.01)
*G06F 21/57* (2013.01)

(52) U.S. Cl.
CPC .......... *G06F 17/2235* (2013.01); *G06F 21/577* (2013.01); *H04L 63/1441* (2013.01); *H04L 63/168* (2013.01)

(58) Field of Classification Search
CPC .............. G06F 17/2235; G06F 21/577; G06F 2221/2119; H04L 63/1483; H04L 63/1441; H04L 63/168
See application file for complete search history.

(56) References Cited

U.S. PATENT DOCUMENTS

| 6,301,699 B1 * | 10/2001 | Hollander ............... G06F 21/55 717/131 |
| 8,079,087 B1 * | 12/2011 | Spies ................. G06F 17/30873 709/205 |
| 8,296,664 B2 * | 10/2012 | Dixon et al. .................. 715/760 |

(Continued)

FOREIGN PATENT DOCUMENTS

EP            2587743            5/2013

OTHER PUBLICATIONS

Balamuralikrishna et al., "Mitigating online fraud by ant phishing model with URL & image based webpage matching", International Journal of Scientific & Engineering Research vol. 3, Issue 3, Mar. 2012.

(Continued)

*Primary Examiner* — Morshed Mehedi
*Assistant Examiner* — Sharon Lynch
(74) *Attorney, Agent, or Firm* — Anthony J. Canale

(57) ABSTRACT

A method of presenting hyperlink data. The method comprises identifying when a web browser running on a web browser client retrieves, in response to a web document data request submitted to a target server, a first web document data for displaying a first web document containing a hyperlink having a label for display and a target destination defining an address of a second web document, evaluating a risk from content of the second web document, generating by the web browser to a reference evaluation indication of the risk, and processing the web document data and the reference evaluation indication by the web browser for generating a presentation on the client terminal which combines the first web document data and the reference evaluation indication such that when the reference evaluation indication is presented when the label is presented by the web browser.

15 Claims, 3 Drawing Sheets

(56) References Cited

U.S. PATENT DOCUMENTS

| | | | |
|---|---|---|---|
| 8,429,545 B2* | 4/2013 | Dixon et al. | 715/760 |
| 8,438,499 B2* | 5/2013 | Dixon et al. | 715/809 |
| 8,438,642 B2* | 5/2013 | Feng | G06F 21/566 |
| | | | 713/154 |
| 8,516,377 B2* | 8/2013 | Dixon et al. | 715/738 |
| 8,826,154 B2* | 9/2014 | Dixon et al. | 715/760 |
| 8,984,640 B1* | 3/2015 | Emigh | H04L 63/1441 |
| | | | 726/13 |
| 2005/0289148 A1* | 12/2005 | Dorner | G06F 21/52 |
| 2006/0015722 A1* | 1/2006 | Rowan et al. | 713/166 |
| 2006/0123464 A1 | 6/2006 | Goodman et al. | |
| 2006/0218403 A1* | 9/2006 | Sauve et al. | 713/175 |
| 2006/0253458 A1* | 11/2006 | Dixon et al. | 707/10 |
| 2006/0253578 A1* | 11/2006 | Dixon et al. | 709/225 |
| 2006/0253580 A1* | 11/2006 | Dixon et al. | 709/225 |
| 2006/0253583 A1* | 11/2006 | Dixon et al. | 709/225 |
| 2006/0253584 A1* | 11/2006 | Dixon et al. | 709/225 |
| 2006/0294588 A1* | 12/2006 | Lahann | H04L 63/1416 |
| | | | 726/23 |
| 2007/0074125 A1* | 3/2007 | Platt et al. | 715/760 |
| 2007/0118898 A1* | 5/2007 | Morgan et al. | 726/22 |
| 2007/0130350 A1* | 6/2007 | Alperovitch et al. | 709/229 |
| 2008/0109473 A1* | 5/2008 | Dixon et al. | 707/102 |
| 2008/0114709 A1* | 5/2008 | Dixon et al. | 706/13 |
| 2008/0172738 A1* | 7/2008 | Bates | G06F 17/30887 |
| | | | 726/22 |
| 2009/0287653 A1* | 11/2009 | Bennett | H04L 63/145 |
| 2010/0211796 A1* | 8/2010 | Gailey | G06F 21/31 |
| | | | 713/182 |
| 2012/0060221 A1 | 3/2012 | Gerber et al. | |
| 2012/0131187 A1* | 5/2012 | Cancel et al. | 709/224 |
| 2012/0158626 A1* | 6/2012 | Zhu | H04L 63/1408 |
| | | | 706/13 |
| 2012/0185942 A1* | 7/2012 | Dixon et al. | 726/24 |
| 2012/0317467 A1* | 12/2012 | Cahill | G06F 17/30905 |
| | | | 715/205 |
| 2012/0324568 A1 | 12/2012 | Wyatt et al. | |
| 2013/0055395 A1* | 2/2013 | Milener | G06F 21/51 |
| | | | 726/24 |
| 2013/0133071 A1 | 5/2013 | Mahaffey | |
| 2014/0380472 A1* | 12/2014 | Peterson | H04L 63/1416 |
| | | | 726/23 |

OTHER PUBLICATIONS

Alan Ho, "Website security for mobile", SANS Institute InfoSec Reading Room, Apr. 2013.

* cited by examiner http://this-is-my-site.com

FIG. 3A xx http://this-is-my-site.com xx

FIG. 3B

Beware:  ———————  Http://this-is-my-site.com 99.999% of visitors left the site after 1 sec

FIG. 3C

HYPERLINK DATA PRESENTATION

BACKGROUND

The present invention, in some embodiments thereof, relates Web browser technology and, more specifically, but not exclusively, to methods and systems for allowing a Web browser to present automatically hyperlink data. For brevity, a web browser means any software or firmware that allows users to navigate to web documents using hyperlinks, such as Chrome™, Internet Explorer™, Portable Document Format (PDF) readers, email clients, presentations and word processors.

During the last years malicious web pages became a major risk for users. Google™, for example, finds about 9,500 new malicious Web sites per day. Some of these websites are designed to either gather your information which can lead to a loss of privacy or exploitation or to gain unauthorized access to system resources. Malicious web pages may contain malicious code or script, such as a virus, a worm, Trojan software, a spyware, and/or another tool which may affect the use of a web browser client, such as a laptop, a desktop, a Smartphone, and a tablet or obtain personal details of the user(s) of the web browser client.

Deceiving users to browse to malicious web pages is usually done by leading them to activate (e.g. touching and/or clicking) hyperlinks to these malicious web pages. This may be done by displaying a label of a hyperlink that includes a valid address of a known website (e.g. wwwdotibmdotcom) where the target resource locator, for example the Uniform Resource Locator (URL) of the hyperlink is set to refer the browser to a malicious website. This security vulnerability allows attackers to exploit the fact that many users do not probe the structure of a hyperlink, for example do not match between the string in a display label field, a text which may include a URL for presentation, and the string in a target field (i.e. the href value) that includes a URL that is actually used by the browser for browsing to associated content.

SUMMARY

According to some embodiments of the present invention, there is provided a method of presenting hyperlink data. The method comprises identifying when a web browser running on a web browser client retrieves, in response to a web document data request submitted to a target server, a first web document data for displaying a first web document containing a hyperlink having a label for display and a target destination defining an address of a second web document, evaluating a risk from content of the second web document, generating by the web browser a reference evaluation indication of the risk, and processing the web document data and the reference evaluation indication by the web browser for generating a presentation on the client terminal which combines the first web document data and the reference evaluation indication such that when the reference evaluation indication is presented when the label is presented by the web browser.

Optionally, the address is a uniform resource identifier (URI).

More optionally, the evaluating comprises identifying a discrepancy between a first string indicative of an additional address of a web document and the address of the second web document.

More optionally, the evaluating comprises matching the address with a list comprising a plurality of addresses and determining the risk accordingly.

Optionally, the method further comprises logging a plurality of browsing actions performed by a plurality of different users on the second web document; wherein the evaluating is performed according to a statistical analysis of the plurality of browsing actions.

Optionally, the presentation comprises an audible presentation of the reference evaluation indication when a user manually selects the label.

Optionally, the presentation comprises a visible presentation of the reference evaluation indication when a user manually selects the label.

Optionally, the evaluation indication is an overlay which covers at least some of the label.

Optionally, the evaluation indication is a change in an editing property of at least some of the label.

More optionally, the evaluation indication is a change in an editing property of at least some of the label.

Optionally, the web browser client is a mobile device.

According to some embodiments of the present invention, there is provided a system of presenting hyperlink data. The system comprises a processor, a web browser module installed on a client terminal hosting a web browser which retrieves a first web document data for displaying a first web document containing a hyperlink having a label for display and a target destination defining an address of a second web document, and a malicious hyperlink module which evaluates, using the processor, a risk from content of the second web document. The web browser module generates a reference evaluation indication of the risk and processes the web document data and the reference evaluation indication on the client terminal for generating a presentation which combines the first web document data and the reference evaluation indication such that the reference evaluation indication is presented when the label is presented by the web browser.

Optionally, the malicious hyperlink module is installed on a central unit which communicates with the web browser module via a network.

Optionally, the web browser module is installed as an add-on of the web browser.

Optionally, the web browser module is integrated in the web browser.

Optionally, the address is a uniform resource identifier (URI).

Optionally, the malicious hyperlink module identifies a discrepancy between a first string indicative of an additional address of a web document and the address of the second web document during the evaluation.

More optionally, the malicious hyperlink module matches the address with a list comprising a plurality if address and determining the risk accordingly during the evaluation.

Optionally, the evaluation is performed according to a statistical analysis of a plurality of browsing actions performed on the second web document.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A-3C depict how arrays of "x" characters forming a fence shape are displayed as an overlay on top of a URL of as a label of a hyperlink, indicating that the hyperlink is estimated to bring risk to the web browser client, according to some embodiments of the present invention.

DETAILED DESCRIPTION

Figure 1:
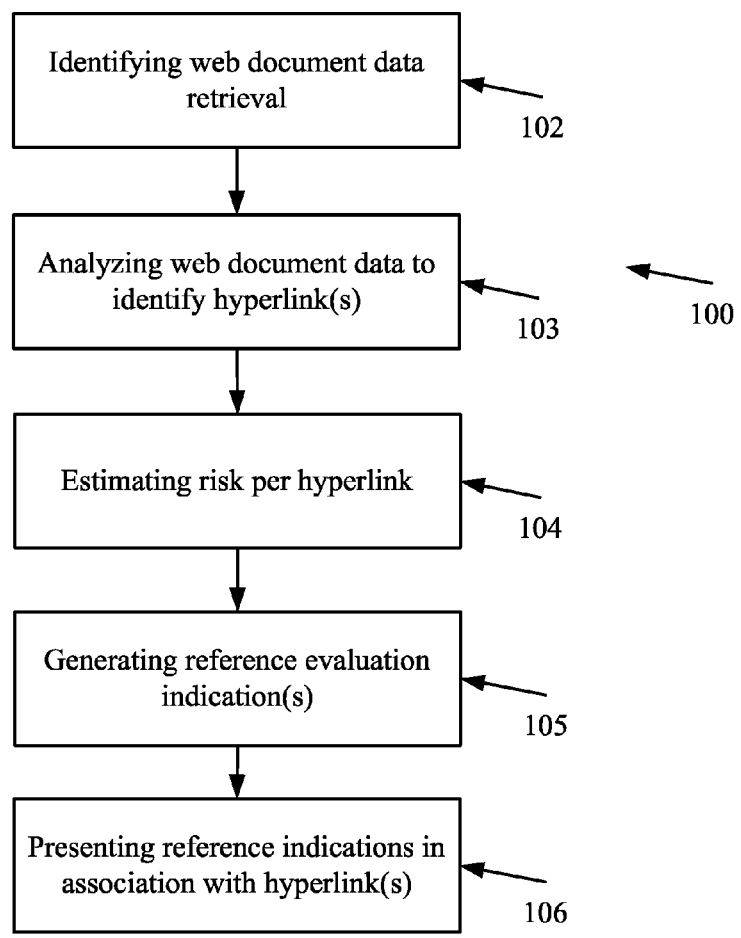
FIG. 1 is a flowchart of a method of visualizing, or otherwise presenting, a risk brought about by a hyperlink in a presentation of a web document on a web browser client, according to some embodiments of the present invention.

The present invention, in some embodiments thereof, relates Web browser technology and, more specifically, but not exclusively, to methods and systems for allowing a Web browser to present automatically hyperlink data.

According to some embodiments of the present invention, there are provided methods and systems of indicating to a browsing user that a hyperlink presented thereto in a web document refers to a malicious and/or untrusted content, such as code of viruses, Trojan horses, and/or worms and phishing sites and/or the like. The methods and systems are based on a browser module (either add-on, integrated, browser code or script) that generates reference evaluation indication(s) indicative of the risk brought about some or all of the hyperlinks in a requested web document and combines the evaluation indication(s) with label(s) of these hyperlink(s) such that a browsing user cannot be easily mislead by the content of the label(s).

The above allows preventing tricking users into pressing hyperlinks to malicious and/or untrusted sites by using hyperlinks which direct web browser to malicious and/or untrusted content even though they consists labels showing valid and common URLs (e.g., wwwdotcnndotcom).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart of a method of visualizing, or otherwise presenting, a risk brought about by a hyperlink in a presentation of a web document on a web browser client, according to some embodiments of the present invention. The presentation is optionally managed at the browser level, based on analysis of hyperlinks in a loaded web document. The web document may be a webpage, a WORD document, a portable document format (PDF) document, an excel spreadsheet document, an extensible markup language (XML) page, a hypertext markup language (HTML) page, an Internet page, or any other content file that is accessible via a communication network. The method may be implemented by a web browser or a web browser extension, for instance an add-on, for example a toolbar.

Figure 2:
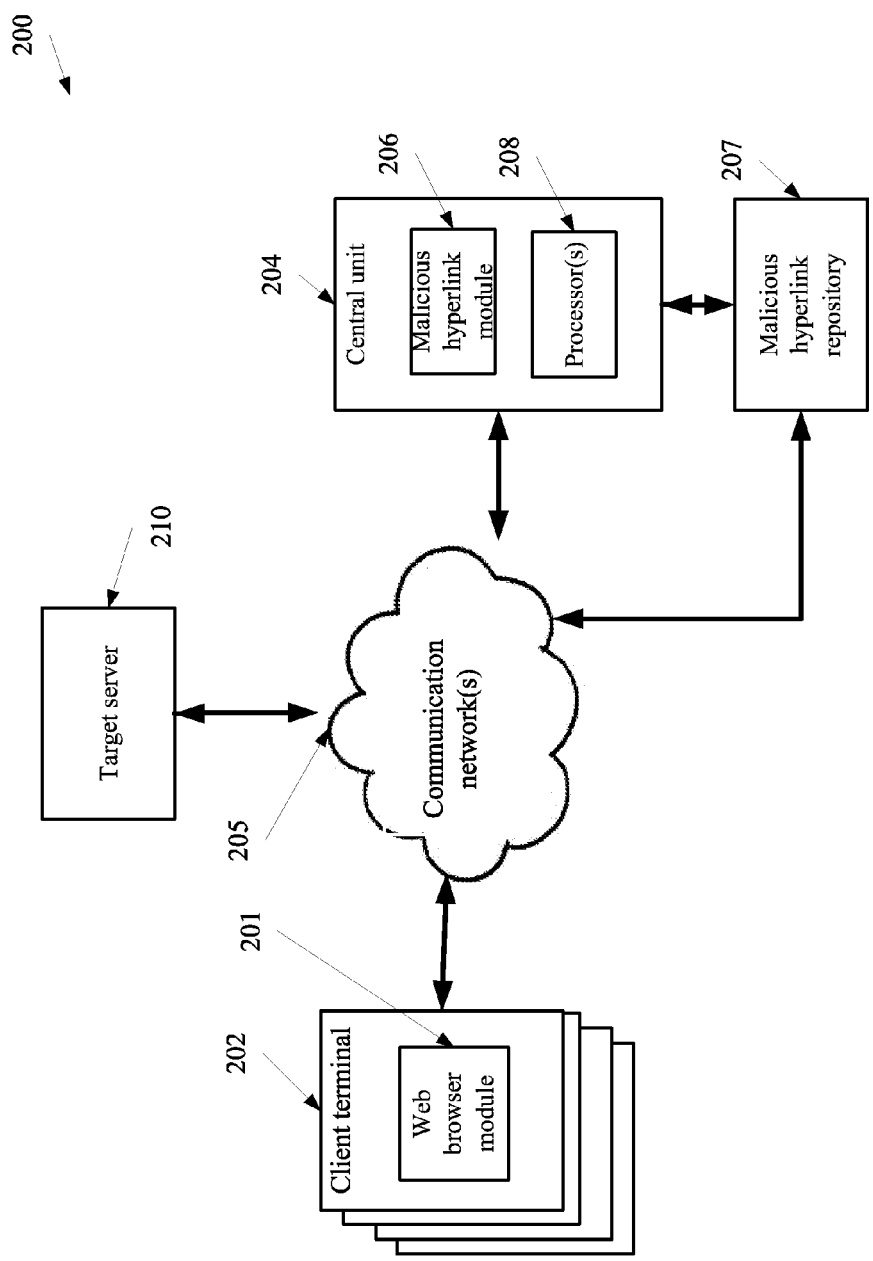
FIG. 2 which is a schematic illustration of a system of visualizing, or otherwise presenting, a risk brought about by a hyperlink in a presentation of a web document on a web browser client, according to some embodiments of the present invention.

Reference is also made to FIG. 2 which is a schematic illustration of a system 200 of visualizing, or otherwise presenting, a risk brought about by a hyperlink in a presentation of a web document on a web browser client, according to some embodiments of the present invention. The system 200 may be used for implementing the method 100. The system 200 includes a web browser module 201 which is either integrated part or an extension of a web browser installed in a web browser client 202 that is connected to a network 205. The web browser client may be a laptop, a desktop, a Smartphone, a tablet, or any client device that hosts and executes a web browser.

According to some embodiments of the present invention, the system 200 includes a central unit 204 for updating the browser module 201 about malicious and/or untrusted hyperlink(s), for example in response to a request that is sent to the central unit 204 when web document data of a retrieved (i.e. uploaded) web document is requested by the web browser. The central unit 204 is optionally processor based, as shown at 208. As used herein, malicious content means a security risk content, such as virus, a worm, a Trojan software, a spyware, and/or another tool which may affect the use of a web browser client, a media content (e.g. text, video, audio) characterized by malice prepense and/or age sensitive content, for instance pornographic content, a media content of a scam and/or any other misleading content.

The central unit 204, for example a network node, such as a processor based server, hosts a malicious hyperlink module 206. The central unit 204 may be connected to include a malicious hyperlink repository 207 which documents malicious hyperlinks accessible via the computer network 205, for example the Internet.

The system 200 provides an infrastructure to allow a web browser that presents a web document to identify risks brought about by hyperlink(s) in the web document and to adapt the presentation of the web document to indicate the risks associated with the presentation of the hyperlink(s).

In use, the web browser installed on the web browser client 202 is used to submit a web document data request to a target server 210, for example submitting a GET request according to hypertext transfer protocol (HTTP) protocol, for example as described in RFC 2616.

As shown at 102, the web browser module 201 intensifies a retrieval of web document data for displaying the requested web document that is performed in response to the above web document data request.

As shown at 103, the web document data is analyzed, for instance by the web browser module 201, to identify one or more hyperlinks which are set to be presented with the web document, for example having a label field that includes text to be presented.

Now, as shown at 104, for each hyperlink documented in the web document data, a risk from web document referred to in a target field thereof is evaluated according to an analysis of the target destination thereof, for example a uniform resource identifier (URI) in a target field, for example link target in Hypertext Transfer Protocol (HTTP)/XX, actual link in MediaWiki, HREF attribute, also called link destination, and/or the like.

Optionally, as shown in FIG. 2, the evaluation is performed by the malicious hyperlink module 206 that is installed in the central unit 204. Such a malicious hyperlink module may perform the evaluation in advance, for example periodically for a cluster of web documents and/or in response to request from the web browser which loads the requested web document, for example in response to a request message from the web browser and/or web browser module 201. Additionally or alternatively, the evaluation is performed by a malicious hyperlink module that is installed in the client terminal, for instance as a sub module of the web browser module.

Optionally, the risk is a risk grade or risk level calculated or selected according to the address in the target field. Optionally, the risk is a binary value (e.g. malicious or not malicious, security risk or no security risk) selected according to the address in the target field.

Optionally, a risk is identified when a discrepancy between a link or reference in a label field, for example a string that includes a URI, and a link or reference in a target field, for example another string that includes a different URI, is identified, for example locally by the web browser module 201. Examples for a label field may be an anchor text, link label, link text, link title or any other visible, clickable text. Such a discrepancy may be identified by a simple string match and/or by extracting words from the fields and matching them.

Such a discrepancy is indicative of a trial to deceive a browsing user, making him or her to believe he or she is browsing to a web page having a resource locator (e.g. URI) presented to him while actually the browser is instructed to browse to another web page having a different resource locator (e.g. URI).

Optionally, a risk is identified by matching the target destination of the hyperlink, for example from the target field, with records of a black list and/or a white list of resource locators, such as URIs. Optionally, the matching is performed by the malicious hyperlink module 206 that receives a message with the target destination, for example from the browser module 201, and checks accordingly the records in the malicious hyperlink repository 207.

Optionally, a risk is identified by analyzing user actions of a plurality of users who visited the requested web document, for instance using the browser modules 201 which are installed in their client terminals 202. In such embodiments, user actions such as site visiting time, webpage visiting time, bookmark marking, browser malfunction, downloading, downloading cancelation, add-on installation, add-on installation cancelation, browsing actions and/or the like are monitored and statistically analyzed to evaluate respective web documents. The user actions are optionally logged and statistically analyzed to evaluate risk and/or user interest.

Now, as shown at 105, reference evaluation indication(s) indicative of the risk brought about some or all of the hyperlinks in the requested web document are generated, for example by the browser module 201.

Optionally, the reference evaluation indication is presented visually with the referred target and/or when the hyperlink is selected, for example clicked, marked with a cursor (with or without an additional action), and/or touched, requiring verification from the selecting user. For example, a reference evaluation indication for the hyperlink(s) is an overlay to be presented on top of content from the label field of the hyperlink. Optionally, the reference evaluation indication is a change in the text editing properties, for example change in the color and/or font and/or text size and/or style in which the hyperlink(s) is presented. Optionally, different text editing properties may be indicative of different levels of risk. For example, green, orange and red may indicate different risk levels.

Optionally, the reference evaluation indication is audibly played with the presentation of the hyperlink and/or before browsing to the referred target in the hyperlink. For example, the reference evaluation indication is a distinct sound, a verbal warning and/or a combination thereof. Optionally, the reference evaluation indication is played only if the evaluation is indicative of a risk is above a threshold and/or of a malicious content.

As shown at 106, risk brought by hyperlinks is visualized, or otherwise presented, by the web browser by presenting these reference evaluation indication(s) in association with the respective hyperlink(s) when the requested web document is presented. Optionally, the visualization ensures that content of the label field is not presented without the reference evaluation indication, for instance by placing the reference evaluation indication on top of the content in the label field when presented. For example, the reference evaluation indication(s) includes placing a line or a mark through the characters of the presented label(s) of the hyperlink(s). For instance, FIGS. 3A and 3B depict how an array of "x" characters (in small letter or capital letter), forming a fence shape, are displayed as an overlay on top of content of a label field of a hyperlink (i.e. a URL), indicating that the hyperlink is estimated to bring risk to the web browser client. By placing the reference evaluation indication on top of the label of the hyperlink, it is ensured regardless of the resolution in which the label is presented and/or the size of the display (e.g. on a mobile device display, in augmented reality display, in a wearable device display, such as a watch) related reference evaluation indication is provided to the browsing user before she decides to use the respective hyperlink.

The visualization is rendered by the web browser on the web browser client 201 as the web document data is combined with the reference evaluation indication(s) such that the presented label(s) of the hyperlinks are in a visual association with the reference evaluation indication(s).

Optionally, a risk interpretation, such as a literal interpretation, is presented in association with the reference evaluation indication, for example in a text box, for instance as shown at FIG. 3C, according to some embodiments of the present invention. The literal interpretation may be acquired from the malicious hyperlink repository 207, for instance from a record associated with the respective resource locator. The literal interpretation may be indicative of statistical analysis of user actions performed in response to browsing to the requested web document.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a unit, a system, a network and a module, is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of dynamically adapting a presentation of hyperlink data displayed on a display of a client terminal by a web browser, said method comprising:
    identifying, by said client terminal, when said web browser running on said client terminal retrieves, in response to a web document data request submitted to a target server, web document data for displaying, on a display of said client terminal, a first web document, said first web document containing a hyperlink having a label field comprising a label for display and a target field comprising a target destination defining an address of a second web document;
    identifying a discrepancy between said label and said address;
    automatically identifying a risk of malicious content from content of said second web document based on said discrepancy;
    automatically processing said web document data and said risk to generate said presentation;
    displaying, on said display, said presentation, said presentation showing said label and a visual indication of said risk, said visual indication comprising a line of multiple instances of a character overlaying at least part of said label; and,
    playing an audible presentation of said risk when a user manually selects said label and said risk is above a threshold.

2. The method of claim 1, further comprising identifying a risk level of said risk, said visual indicator further indicating said risk level.

3. The method of claim 2, said identifying of said risk comprising matching said address with another address on a list comprising a plurality of addresses in a malicious hyperlink repository and determining said risk accordingly.

4. The method of claim 1, further comprising logging a plurality of browsing actions performed by a plurality of different users on said second web document, said identifying of said risk comprising evaluating said risk according to a statistical analysis of said plurality of browsing actions.

5. The method of claim 1, wherein said presentation comprises a visible presentation of said indication when a user manually selects said label.

6. The method of claim 1, said visual indicator having a specific editing property indicating said risk level.

7. The method of claim 1, said client terminal being a mobile device.

8. A system of dynamically adapting a presentation of hyperlink data displayed on a display of a client terminal by a web browser, said system comprising:
    said display;
    a processor;
    a memory adapted to store a code activated by said web browser executed by said processor, said code comprising:
    code instructions for a retrieving a web document data for displaying a first web document on said display;
    code instructions for identifying when said first web document contains a hyperlink having a label field comprising a label for display and a target field comprising a target destination defining an address of a second web document;
    code instructions for identifying a discrepancy between said label and said address;
    code instructions for identifying a risk of malicious content from content of said second web document based on said discrepancy;
    code instructions for automatically processing said web document data and said risk to generate said presentation;
    code instructions for visually displaying, on said display, said presentation, said presentation showing said label and a visual indication of said risk, said visual indication comprising a line of multiple instances of a character overlaying; and,
    code instructions for playing an audible presentation of said risk when a user manually selects said label and said risk is above a threshold.

9. The system of claim 8, said client terminal being a mobile device.

10. The system of claim 8, wherein said code is an add-on to said web browser.

11. The system of claim 8, wherein said code is integrated into a code of said web browser.

12. The system of claim 8, said visual indicator further having an editing property indicative of a risk level associated with said risk.

13. The system of claim 8, said identifying of said risk comprising matching said address with another address on a list comprising a plurality of addresses in a malicious hyperlink repository and determining said risk accordingly.

14. The system of claim 8, said risk further being evaluated according to a statistical analysis of a plurality of browsing actions performed on said second web document.

15. A computer program product for presenting hyperlink data, comprising:
- a non-transitory computer readable storage medium;
- first program instructions to identify when a web browser installed in a client terminal retrieves, in response to a web document data request to a target server, web document data for displaying a first web document on a display of said client terminal, said first web document containing a hyperlink having a label field comprising a label for display and a target field comprising a target destination defining an address of a second web document;
- second program instructions to identify a discrepancy between said label and said address;
- third program instructions to identify a risk of malicious content from content of said second web document based on said discrepancy;
- fourth program instructions to process said web document data and said risk to generate said presentation; and
- fifth program instructions to display said presentation on said display of said client terminal, said presentation showing said label and a visual indication of said risk, said visual indication comprising a line of multiple instances of a character overlaying; and,
- sixth program instruction to play an audible presentation of said risk when a user manually selects said label and said risk is above a threshold,
- wherein said first, second, third, fourth, fifth and sixth program instructions are stored on said non-transitory computer readable storage medium and executable by a processor.

* * * * *